(12) United States Patent
Tasaki et al.

(10) Patent No.: US 6,785,268 B1
(45) Date of Patent: Aug. 31, 2004

(54) DIGITAL SWITCHING SYSTEM

(75) Inventors: Yuuichi Tasaki, Tokyo (JP); Masahiko Honda, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/471,274

(22) Filed: Dec. 23, 1999

(30) Foreign Application Priority Data

Dec. 28, 1998 (JP) .......................................... 10-374502

(51) Int. Cl.[7] ............................................ H04L 12/50
(52) U.S. Cl. ........................ 370/366; 370/366; 370/380
(58) Field of Search ................................ 370/366, 380, 370/395.1, 60

(56) References Cited

U.S. PATENT DOCUMENTS

| | | | | |
|---|---|---|---|---|
| 4,603,416 A | * | 7/1986 | Servel et al. .................. | 370/60 |
| 5,796,733 A | * | 8/1998 | Norris ........................ | 370/366 |

* cited by examiner

Primary Examiner—Dang Ton
Assistant Examiner—Robert W. Wilson
(74) Attorney, Agent, or Firm—Sughrue Mion, PLLC

(57) ABSTRACT

A digital switching system capable of changing switching capacity without any recourse of increasing or decreasing the quantities of line terminals or cross-point switches. The digital switching system comprises line terminals which send and receive data as serial data to and from the user, a switching arrangement which switches, based on destination information, the parallel data converted from the serial data, and data converters capable of converting between the serial data and the parallel data at a specified conversion ratio. The serial/parallel converter circuit of a serial/parallel converter in a digital switching system comprises a 1:4 transceiver, four variable converters, and 16 selector circuits The 1:4 transceiver converts serial data into 4-bit wide parallel data and sends the parallel data to the variable converters. If mode selection information specifies a conversion ratio of 1:4, only a tristate buffer is enabled and 4-bit wide parallel data is output. When the conversion ratio is 1:8 or 1:16, only a tristate buffer is enabled, respectively, and 8-bit wide or 16-bit wide parallel data is output, respectively.

2 Claims, 3 Drawing Sheets

DIGITAL SWITCHING SYSTEM

BACKGROUND OF THE INVENTION

1. Field of the Invention

This invention relates to a digital switching system, and more particularly to a digital switching system comprising line terminals which send and receive data as serial data to and from the user, a space-switching arrangement which switches, based on destination information, the parallel data converted from said serial data, and data converters which convert between said serial data and said parallel data.

2. Description of the Prior Art

A conventional digital switching system of this type is described in Japanese Patent Laid-Open No. 1-233858. This switching system comprises a serial/parallel converter circuit (1) which converts a plurality of fixed-length serial packet signals representing as a whole all the channels (n) to be converted, into a plurality (k) of parallel packet signals, a space-switching arrangement which comprises k matrices of (n/k)×(n/k) switches arranged in parallel and which converts k sets of parallel packet signals received from the serial/parallel converter circuit, and a parallel/serial converter circuit (3) which converts k sets of parallel packet signals received from the space-switching arrangement.

BRIEF SUMMARY OF THE INVENTION

Object of the Invention

The conventional digital switching system described above, however, had a problem in that in order to change the capacity of the space-switching arrangement, it was necessary to change the capacity of the space-switching circuit itself or change the numbers of lines and space-switches.

Accordingly, the object of this invention is to provide a digital switching system capable of changing switching capacity without any recourse of increasing or decreasing the quantities of line terminals or cross-point switches.

SUMMARY OF THE INVENTION

The digital switching system according to a first aspect of this invention comprises line terminals which send and receive data as serial data to and from the user, a switching arrangement which switches, based on destination information, the parallel data converted from said serial data, and data converters capable of converting between said serial data and said parallel data at a specified conversion ratio.

The digital switching system according to a second aspect of this invention comprises N sending line terminals each of which receives serial data from the user, a serial/parallel converter having N serial/parallel converter circuits each of which converts the serial data into K-bit wide parallel data at the conversion ratio provided externally by mode selection information, a switching arrangement having M (M≧K) cross-point switches of which K (M≧K) cross-point switches select one bit each, based on destination information, from their respective assigned bit locations in said N sets of K-bit wide parallel data, a parallel/serial converter having N parallel/serial converter circuits which convert the K-bit wide parallel data received one bit each from said K cross-point switches, into serial data, and N receiving line terminals each of which sends said converted serial data to the user.

Furthermore, in the digital switching system according to the preferred embodiment of the invention, each of said serial/parallel converter circuits comprises a transceiver which converts said serial data into k1-bit wide parallel data; k1 variable converters having km serial/parallel converters of which k2 serial/parallel converters, in conjunction with a data-through circuit, convert one bit of the transceiver output into parallel data with a width of 2 bits, 4 bits, . . . , or km bits according to the mode selection information provided externally; and selector circuits which select output of each of said variable converters according to said mode selection information and output K-bit wide parallel data.

BRIEF DESCRIPTION OF THE DRAWINGS

This above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENTS

Figure 1:
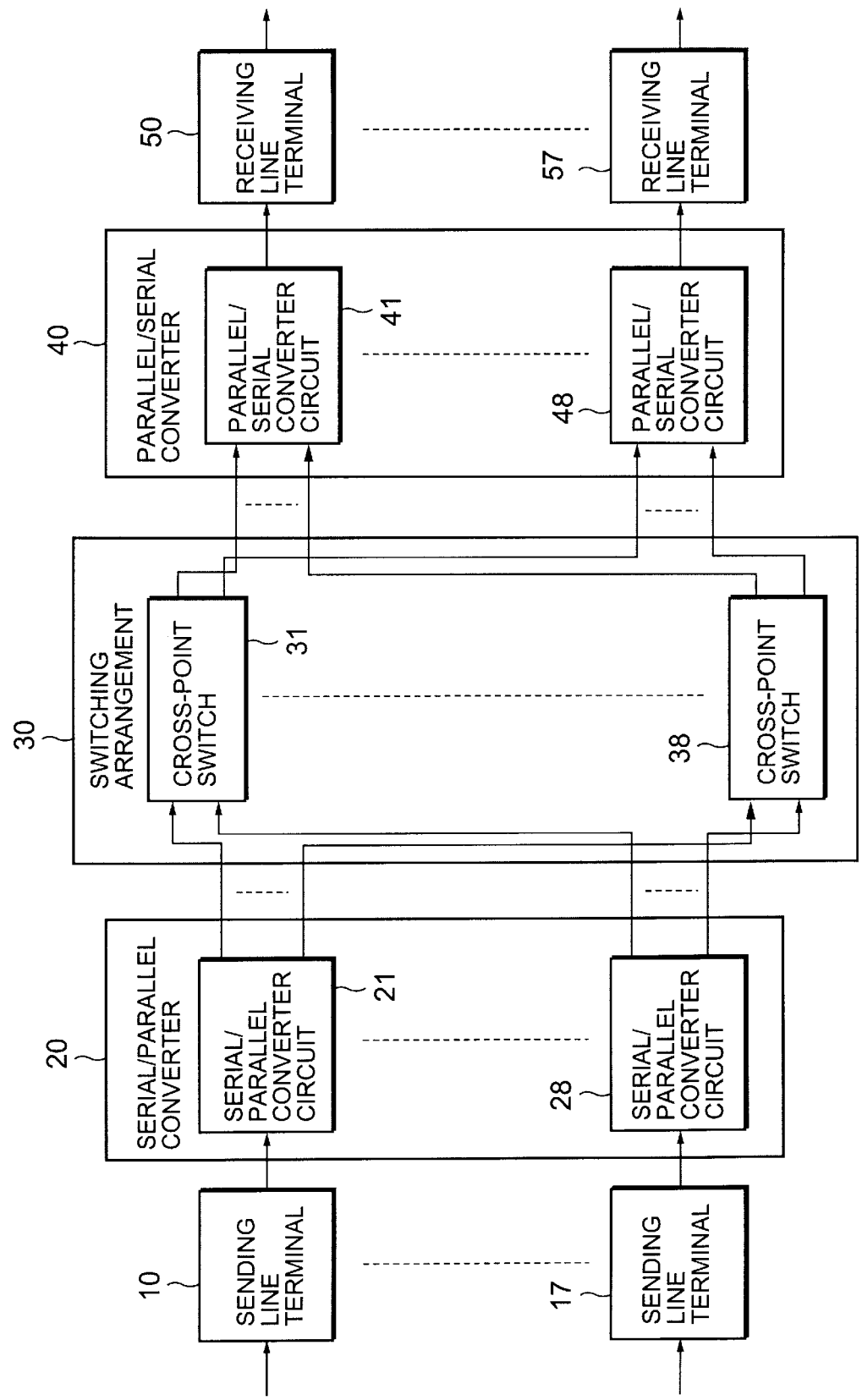
FIG. 1 is a block diagram showing one embodiment of the digital switching system according to this invention.

Now the preferred embodiment of this invention will be described with reference to the attached drawings. Referring to FIG. 1, an embodiment of the digital switching system according to this invention comprises eight sending line terminals 10 to 17 each having an I/O port of serial data, eight receiving line terminals 50 to 57 each having an I/O port of parallel data, a serial/parallel converter 20, a switching arrangement 30, and a parallel/serial converter 40. To indicate the I/O ports clearly, the line terminals are described as the sending line terminals 10 to 17 and receiving line terminals 50 to 57.

The sending line terminals 10 to 17 are connected one-to-one with the user side and receive the data sent from the user side while the receiving line terminals 50 to 57 are connected one-to-one with the corresponding users and send the data to be received by the user side. In other words, the data from the user side is received by the sending line terminals 10 to 17 and then transferred as serial data to the serial/parallel converter 20.

The serial/parallel converter 20 comprises eight serial/parallel converter circuits 21 to 28, each of which has three conversion ratios. The conversion ratios of the serial/parallel converter circuits 21 to 28 can be set from outside. The serial data transferred from the sending line terminals 10 to 17 are converted into parallel data based on the conversion ratio selected by the serial/parallel converter 20 and then sent to the switching arrangement 30.

The switching arrangement 30 comprises cross-point switches 31 to 38 with eight ports, which is as many as the sending line terminals 10 to 17 and receiving line terminals 50 to 57. The cross-point switches 31 to 38, equal in number to the number of parallels, receive the data that has undergone serial/parallel conversion by the serial/parallel converter 20 and perform switching based on destination information.

The parallel/serial converter 40 converts the parallel data switched by the switching arrangement 30 into the original serial data and sends it to the receiving line terminals 50 to 57.

Figure 3:
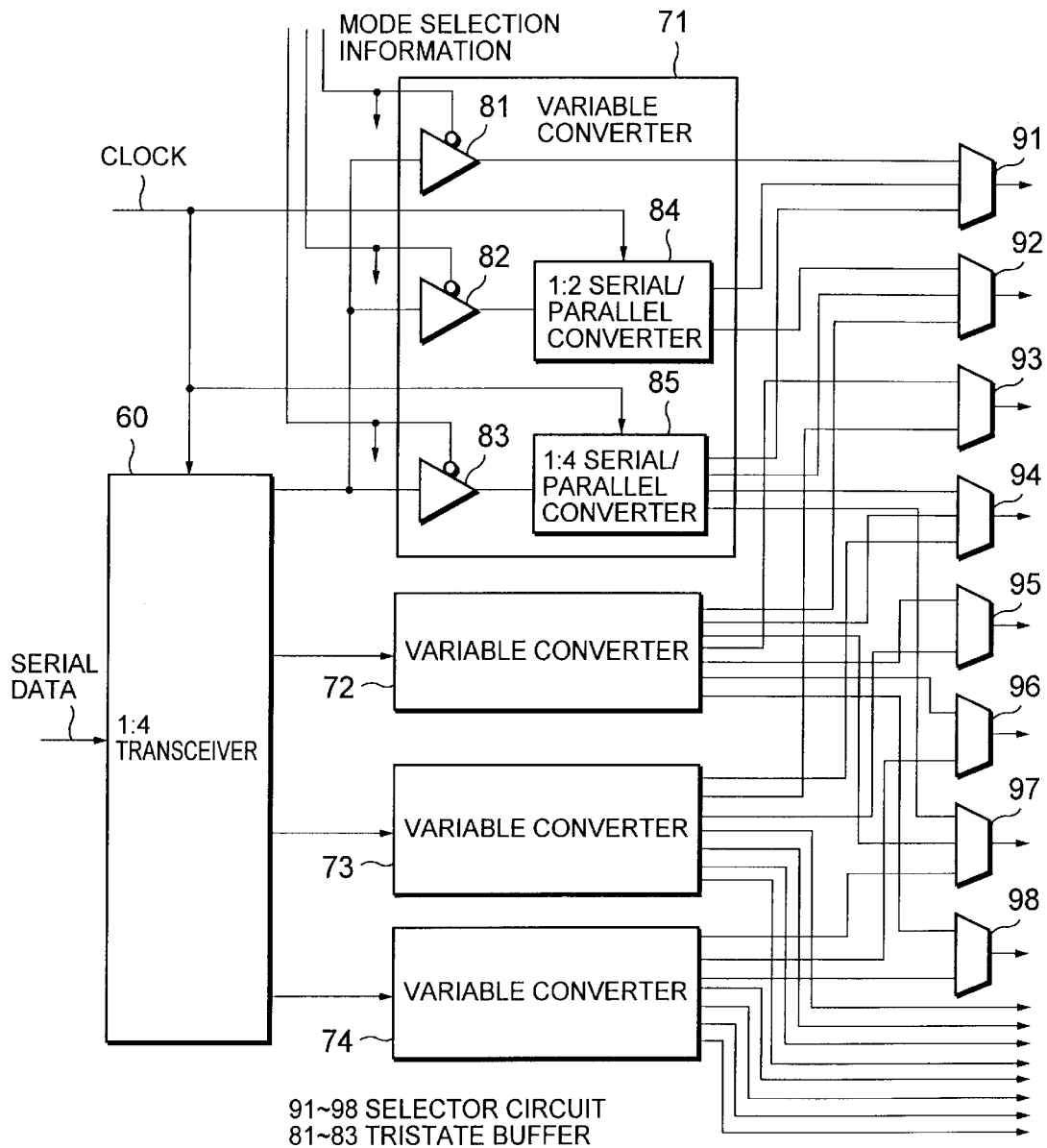
FIG. 3 is a detailed view of the serial/parallel conversion circuit shown in the block diagram of FIG. 1.

FIG. 3 shows an example of the serial/parallel converter circuits 21 to 28 capable of selecting three conversion ratios, namely, 1:4, 1:8, and 1:16. Each of the serial/parallel converter circuits 21 to 28 has a 1:4 transceiver 60, four variable converters 71 to 74, and 16 selector circuits 91 to 106. However, the 16 selector circuits 99 to 106 are not shown to avoid complications in the drawing. Also, since each of the serial/parallel converter circuits 21 to 28 has the same configuration, only the serial/parallel converter circuit 21 will be described below. Regarding the variable converters 71 to 74, only the variable converter 71 will be described for the same reason.

The 1:4 transceiver 60 has the capability of converting the serial data received from the sending line terminals 10 to 17 into 4-bit wide parallel data and sending the parallel data to the four variable converters 71 to 74.

The variable converter 71 comprises three tristate buffers 81, 82, and 83; a 1:2 serial/parallel converter circuit 84; and a 1:4 serial/parallel converter circuit 85. It converts serial data into parallel data at a desired conversion ratio based on mode selection information provided externally. The selector circuits 91 to 106 select output data according to the mode selection information described above.

Now the operation of this embodiment will be described below.

In FIG. 1, the sending line terminals 10 to 17 and receiving line terminals 50 to 57 are connected to the user side, and the switching arrangement 30 having 16×16 cross-point switches 31 to 38 allows the user to communicate with a desired partner.

The serial data inputted to the sending line terminals 10 to 17 are transferred to the serial/parallel converter 20. The serial/parallel converter circuit 21 in the serial/parallel converter 20 has the capability to convert serial data into parallel data at any of the conversion ratios, for example, of 1:4, 1:8, and 1:16. It converts the serial data transferred from the sending line terminals 10 to 17 into parallel data and sends out the parallel data to the switching arrangement 30.

This will be described for individual cases in detail with reference to FIG. 3. The serial data inputted from the sending line terminal 10 is first converted into 4-bit wide parallel data at the 1:4 transceiver 60.

First, if the conversion ratio according to the mode selection information is 1:4, since only the tristate buffer 81 of the variable converter 71 is enabled and the tristate buffers 82 and 83 are disabled, the 1:2 serial/parallel converter 84 and the 1:4 serial/parallel converter 85 are disabled. Consequently, each of the selector circuits 91, 92, 94, and 97 outputs 1-bit wide parallel data, and thus each of the serial/parallel converter circuits 21 to 28 outputs 4-bit wide parallel data, to the cross-point switches 31 to 38. Incidentally, the variable converter 81 constitutes a data-through circuit.

In this case, since four digits of destination information need to be selected, four cross-point switches are enough.

Second, if the conversion ratio according to the mode selection information is 1:8, since only the tristate buffer 82 of the variable converter 71 is enabled and the tristate buffers 81 and 83 are disabled, the 1:4 serial/parallel converter 85 is disabled. Consequently, each of the selector circuits 91 to 98 outputs 1-bit wide parallel data, and thus each of the serial/parallel converter circuits 21 to 28 outputs 8-bit wide parallel data, to the cross-point switches 31 to 38.

In this case, since eight digits of destination information need to be selected, eight cross-point switches are needed.

Third, if the conversion ratio according to the mode selection information is 1:6, since only the tristate buffer 83 of the variable converter 71 is enabled and the tristate buffers 81 and 82 are disabled, the 1:2 serial/parallel converter 84 is disabled. Consequently, in addition to the selector circuits 91 to 98, each of the selector circuits 99 to 106 not shown in the drawing outputs 1-bit wide parallel data, and thus each of the serial/parallel converter circuits 21 to 28 outputs 16-bit wide parallel data, to eight cross-point switches not shown in the drawing in addition to the cross-point switches 31 to 38.

In this case, since 16 digits of destination information need to be selected, 16 cross-point switches are needed. However, they are not shown to avoid complications in the drawing.

Figure 2:
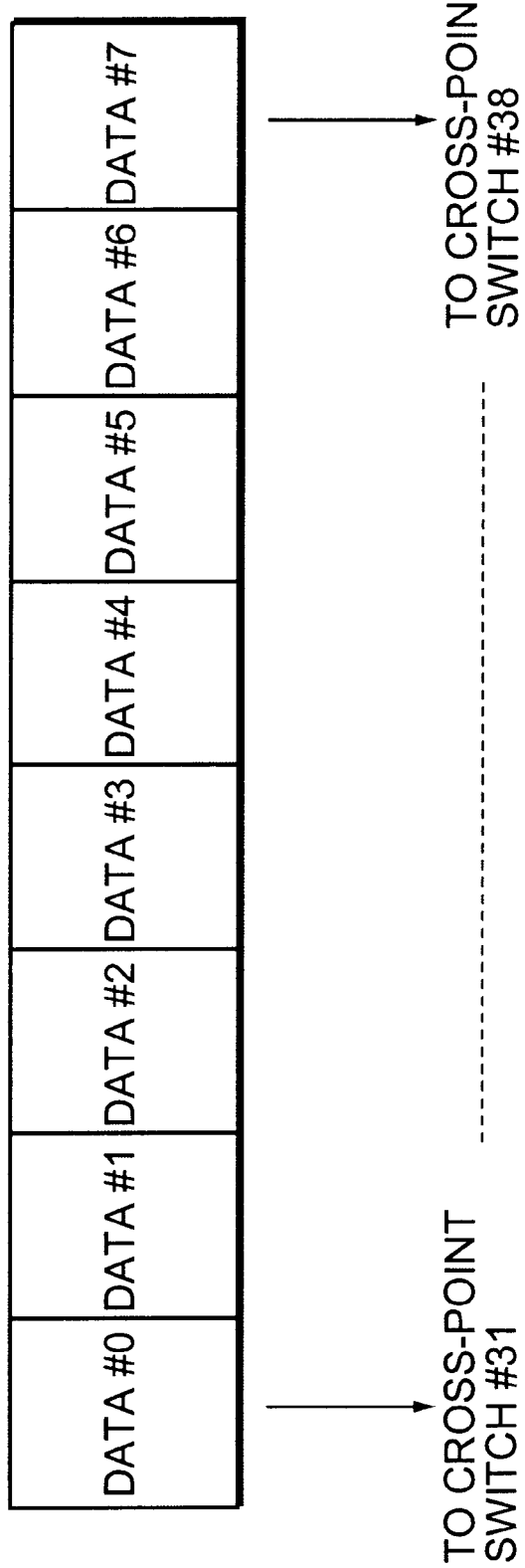
FIG. 2 is a drawing showing 8-bit wide parallel data which is sent bit by bit to cross-point switches in this invention.

If serial data is converted into parallel data at a conversion ratio of 1:8, the parallel data is divided as shown in FIG. 2. Regarding each bit of the divided parallel data, data #0 is sent out to the cross-point switch 31, data #1 to the cross-point switch 32, and so on. Thus, data #7 is sent out to the cross-point switch 38.

The data switched by the cross-point switches 31 to 38 are converted into serial data by parallel/serial converter circuits 41 to 48 and transferred to the receiving line terminals 50 to 57. The parallel/serial converter circuits 41 to 48 are capable of carrying out conversion at the same conversion ratio—for example, at 4:1, 8:1, or 16:1 —as the serial/parallel converter circuits 21 to 28.

Suppose the speed the accommodated line of the line terminals is 100 Mb/s, the switching capacity of the switching arrangement 30 will be 100 Mb/s×8 (cross-points)=800 Mb/s in this example. If the conversion ratio of the serial/parallel converter circuits 21 to 28 is 1:4, however, the quantity of the cross-point switches are halved, and thus the switching capacity will be 100 Mb/s×4 (cross-points)×400 Mb/s.

If the conversion ratio of the serial/parallel converter circuits 21 to 28 is 1:16, the switching capacity will be twice as large as when the conversion ratio is 1:8. In this way, by making the conversion ratio of the serial/parallel converter circuits 21 to 28 variable, it is possible to make the switching capacity variable as well.

The following table shows the quantity of cross-point switches and the ratios of switching capacity (given as 1 when the conversion ratio is 1:8) when the conversion ratios are 1:8, 1:8, and 1:16 .

| Conversion ratio | Q'ty of cross-point switches | Switching capacity |
| --- | --- | --- |
| 1:4 | 4 | 1/2 |
| 1:8 | 8 | 1 |
| 1:16 | 16 | 2 |

According to this invention, by making the conversion ratio for serial/parallel conversion variable during switching, it is possible to change the switching capacity without recourse to increasing or decreasing the quantity of line terminals and cross-point switches, and thus expand the switching capacity without purchasing any additional parts such as line terminals or cross-point switches. This results in improved cost efficiency.

What is claimed is:

1. A digital switching system comprising:

N sending line terminals each of which receives serial data from the user;

a serial/parallel converter having N serial/parallel converter circuits each of which converts the serial data into K-bit wide parallel data at the conversion ratio provided externally by mode selection information;

a switching arrangement having M (M≧K) cross-point switches of which K (M≧K) cross-point switches select one bit each, based on destination information, from their respective assigned bit locations in said N sets of K-bit wide parallel data;

a parallel/serial converter having N parallel/serial converter circuits which convert the K-bit wide parallel data received one bit each from said K cross-point switches, into serial data; and N receiving line terminals each of which sends said converted serial data to the user.

2. The digital switching system as set forth in claim 1, wherein each of said serial/parallel converter circuits comprises:

a transceiver which converts said serial data into k1-bit wide parallel data;

k1 variable converters having km serial/parallel converters of which k2 serial/parallel converters, in conjunction with a data-through circuit, convert one bit of the transceiver output into parallel data with a width of 2 bits, 4 bits, . . . , or km bits according to the mode selection information provided externally; and selector circuits which select output of each of said variable converters according to said mode selection information and output K-bit wide parallel data.

* * * * *